United States Patent [19]

Marin

[11] Patent Number: 4,473,195
[45] Date of Patent: Sep. 25, 1984

[54] PNEUMATIC, EXPANDIBLE SHAFT WITH KEYS

[75] Inventor: Giancarlo Marin, Montecchio Maggiore, Italy

[73] Assignee: S.VE.CO.M. s.n.c.Piccolo Espansibile, Montecchio Maggiore, Italy

[21] Appl. No.: 317,062

[22] Filed: Nov. 2, 1981

[30] Foreign Application Priority Data

Nov. 19, 1980 [IT] Italy .................. 85626 A/80

[51] Int. Cl.³ ............... B65H 75/24; B23B 31/16
[52] U.S. Cl. ................................ 242/72 B; 279/2 A
[58] Field of Search ............. 242/72 B; 279/2 A, 2 R; 269/22, 48.1

[56] References Cited

U.S. PATENT DOCUMENTS

| | | | |
|---|---|---|---|
| 3,006,152 | 10/1961 | Rusche | 242/72 B X |
| 3,048,345 | 8/1962 | Willard | 242/72 B |
| 3,391,878 | 7/1968 | Naccara | 242/72 B |
| 3,945,583 | 3/1976 | Ochs et al. | 242/72 B X |
| 4,147,312 | 4/1979 | Secor et al. | 242/72 R |
| 4,229,014 | 10/1980 | Crowe | 242/72 B X |

*Primary Examiner*—Stuart S. Levy
*Assistant Examiner*—Scott J. Haugland
*Attorney, Agent, or Firm*—Bucknam and Archer

[57] ABSTRACT

A pneumatic expandable shaft having lugs suitable for blocking bobbins mounted on the shaft is described. The shaft comprises in the interior a tube (7) made of resilient material, the tube communicating with the exterior by means of valves (6-15). The valves permit the inflation of the tube by means of compressed air. The shaft has along its surface openings for the passage of lugs (2), the lugs being pushed outwardly under the pneumatic force of the tube (7). When the tube is deflated, the lugs are brought back to their position in the interior of the shaft by the action of springs (14).

2 Claims, 5 Drawing Figures

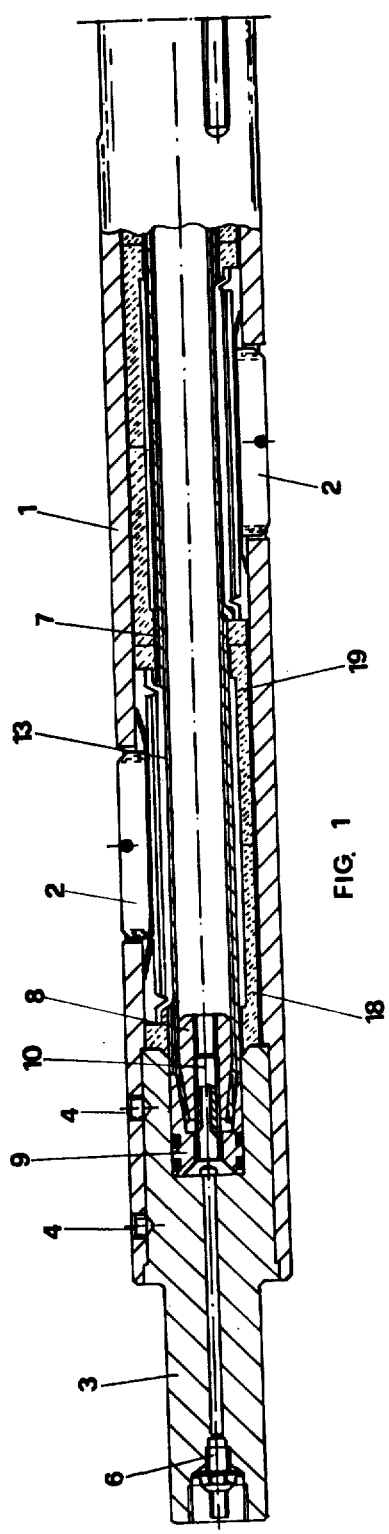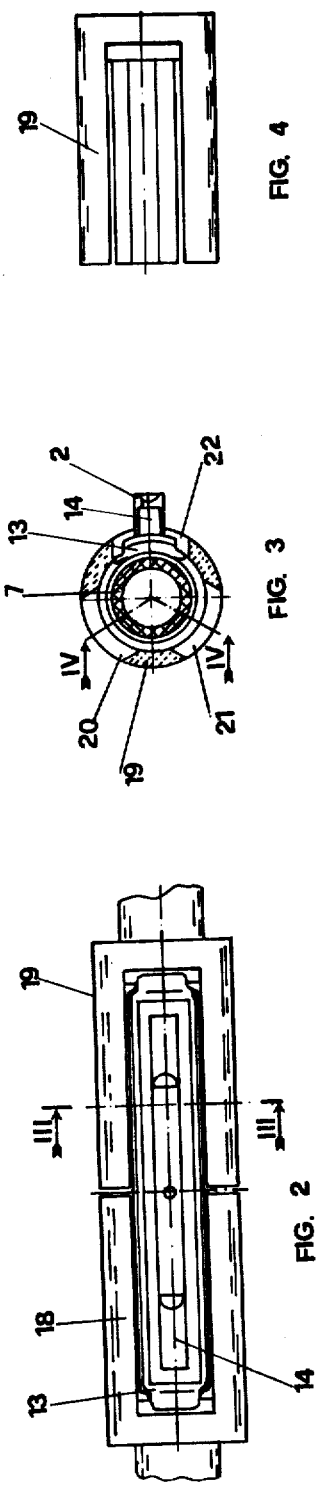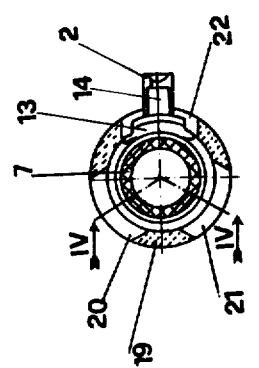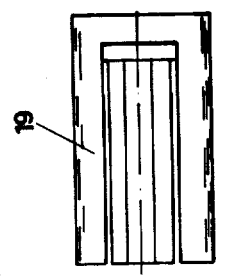

PNEUMATIC, EXPANDIBLE SHAFT WITH KEYS

The present invention falls into the field of shafts having expandable lugs and more specifically shafts in which the lugs expand by pneumatic means. These shafts are suitable for application, particularly as support for bobbins made of paper, linen, fabric or similar material so that rotation of the bobbin is permitted and it is possible to wind or unwind the ribbon of the material which forms the bobbin.

A novel feature of the present invention resides in the fact that in the interior of the shaft, which is simply made of a metallic tube provided with openings for the passage of the lugs, a rubber tube is located, the rubber tube being inflatable under the action of compressed air, which pushes the lugs to the exterior, the lugs going through suitable openings made in the surface of the metallic tube so that the bobbins, which are mounted on the surface, may be blocked.

Another novel feature of the present invention resides in the fact that each lug is located in the interior of suitable protective elements made of plastic material, made in such a shape as to prevent the expansion and the excess deformation of the rubber tube, thus preventing the rupture of the rubber tube.

Advantageously, these protective elements of the rubber tube are placed one close to the other so as to cover the entire length of the rubber tube, except the area in which the lugs are located and openings are provided in positions corresponding to the lugs. Metallic shaped plates go through the openings, the metallic shaped plates being interposed between the rubber tube and each lug.

The lugs are provided with return elastic elements, which act in opposition ot the pressure exerted by the rubber tube for the purpose of making the lugs return to the rest position when the air pressure, which is necessary to inflate the rubber tube, is lacking.

The invention will be described in more detail hereinbelow by reference to the attached drawings of which:

FIG. 1 illustrates a portion of the expandable shaft of the invention, particularly in a longitudinal cross-section.

FIG. 2 is a top view of one of the expandable lugs with its protective element not mounted on the shaft.

FIG. 3 is a cross-section of the lug along line III—III of FIG. 2.

FIG. 4 illustrates one-half of the protective element in cross-section along line IV—IV of FIG. 3.

Figure 5:
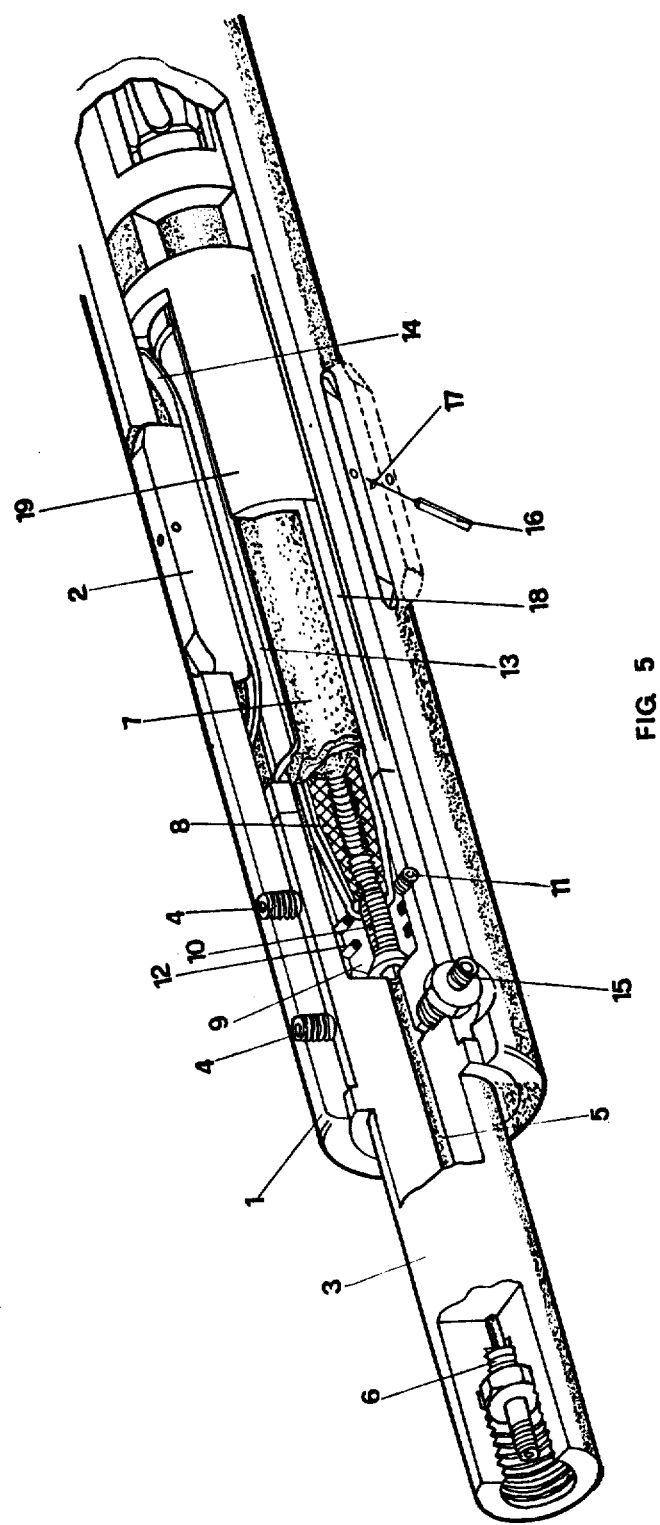
FIG. 5 is a perspective view partially in cross-section of the first portion of an expandable shaft, according to the present invention.

By reference to FIG. 1, the shaft comprises the outer cylindrical metallic tube 1 of the conventional type, which is provided with lateral slits arranged at an angle of 120° between one and the other in groups of three in position offset by 180° successively through which the lugs 2 go through. The lugs block the bobbin supported by the shaft 1.

Pins 3 are inserted at both ends of the shaft, fixed by the threaded dowel 4 and perforated internally as shown at 5, so as to permit the flow of air, which is introduced through valve 6, screwed on the head of pin 3.

The rubber tube 7 is held at the ends between a cone 8 and the goblet-shaped portion 9, which are connected one to the other by means of screw 10. The goblet-shaped portion 9 is blocked in the pin 3 by means of the threaded dowel 11 as shown in FIG. 5, while the elastic rings 12 guarantee an air-seal.

The shaped plates 13 are interposed between the rubber tube 7 and each lug 2 and spring 14 is placed under the lug. The spring 14 makes the wrench return to the interior of the shaft 1 when the tube 7 is deflated.

Numeral 15 designates a supplemental valve, which is placed on the side of the shaft 1 and which permits the inflation of the rubber tube 7 from the side when the passage from the head to permit access to the valve 6 is prevented. The unmounting of the rubber tube is made possible by holding the lugs 2 artificially from the outside by means of pegs 16, which are inserted within openings 17, the pegs 16 acting against the return springs 14.

Each lug 2 is placed within a protective element, which consists of the two cylindrical portions 18 and 19 as shown in FIG. 2. These two portions are preferably made of plastic material and are placed side by side so as to permit three rectangular openings for the passage of the lugs 2 and also the plates 13 and springs 14.

FIGS. 3 and 4 illustrate one particular embodiment of the element 19 which is placed on the side of counterposed element 18, offers protection to the air chamber 7 and permits the free movement of lug 2. Element 19 comprises three openings 20, 21 and 22 which are placed offset at a 120° angle with respect one to the other so as to permit the passage of a group of three lugs offset at 120° one with respect to the other corresponding to each pair of elements 18 and 19.

Naturally, the details of construction of the pneumatic expandable shaft with lugs of the present invention have been described and illustrated in the attached drawings in one particular embodiment, which has been provided merely by way of illustration, but several variations are possible within the scope of the present invention.

The advantages according to the present invention are clear, not only from the point of view of the construction which is simplified and which obviously causes substantial economical savings, but also from the functional point of view because the avoidance of a device or equivalent elements intended to provide reciprocal motion for the purpose of obtaining the expansion of the lugs is accomplished. This object is achieved by the expansion of the rubber tube, which may be made of rubber or similar elastic material and by the introduction of compressed air through suitable valves.

In this manner, a perfect blockage of the bobbins supported by the expandable shaft is achieved with maximum uniformity of the pressure exerted on each lug along the entire length of the shaft.

What is claimed is:

1. A pneumatic expandable shaft (1) having lateral slits, said shaft having lugs (2) in the interior thereof, said lugs being suitable for blocking bobbins mounted on the exterior of said shaft, which comprises in the interior thereof a tube (7) made of resilient material, valves (6-15) for communicating said tube with the exterior thereof, said valves permitting the inflation of the tube by means of compressed air, said lugs being pushed outwardly under the pneumatic force of said tube (7) through said lateral slits, the shaft comprising a shaped metallic plate (13) interposed between each lug and said tube, and a return spring (14) which causes each lug (2) to return to the interior of said shaft (1) when said tube is deflated, said spring acting in opposition to said tube (7), and a plurality of pairs of cylindrical elements (18 and 19) made of plastic material located inside said shaft and outside said tube, each pair placed end to end and each pair having a rectangular opening which bridges the two elements and permits passage therethrough of one of said lugs.

2. The shaft, according to claim 1, wherein each said pair of cylindrical elements (18 and 19) protects said tube (7) and is provided with said rectangular opening for the passage of one of said wrenches which is pushed outwardly by said tube (7) when the tube (7) is inflated by means of compressed air, each pair being offset longitudinally on said shaft from the other pairs, and said openings in said pairs of cylindrical elements being laterally spaced 120 degrees from each other on said surface of said shaft.

* * * * *